(12) United States Patent
Nemir et al.

(10) Patent No.: US 7,221,106 B1
(45) Date of Patent: May 22, 2007

(54) CORDSET BASED APPLIANCE CONTROLLER

(75) Inventors: David C. Nemir, El Paso, TX (US); Stanley S. Hirsh, El Paso, TX (US)

(73) Assignee: X-L Synergy, El Paso, TX (US)

( * ) Notice: Subject to any disclaimer, the term of this patent is extended or adjusted under 35 U.S.C. 154(b) by 304 days.

(21) Appl. No.: 10/789,852

(22) Filed: Feb. 26, 2004

Related U.S. Application Data

(63) Continuation-in-part of application No. 09/692,892, filed on Oct. 19, 2000, now Pat. No. 6,700,333.

(60) Provisional application No. 60/160,275, filed on Oct. 19, 1999.

(51) Int. Cl.
*G05F 1/00* (2006.01)

(52) U.S. Cl. .................. 315/291; 307/41; 307/132 R

(58) Field of Classification Search ............... 315/291, 315/360, 56, 136, 211, 307, 323; 307/113, 307/114, 41, 125, 132 R; 361/100, 101; 340/80
See application file for complete search history.

(56) References Cited

U.S. PATENT DOCUMENTS

| | | | |
|---|---|---|---|
| 3,564,203 A | 2/1971 | Naoi | 219/491 |
| 3,646,438 A | 2/1972 | Staff | 324/73 R |
| 3,979,601 A | 9/1976 | Franklin | 307/141 |
| 4,199,694 A | 4/1980 | Van Zeeland | 307/252 |
| 4,215,277 A | 7/1980 | Weiner et al. | 307/41 |
| 4,276,486 A | 6/1981 | Ahuja et al. | 307/252 R |
| 4,359,626 A | 11/1982 | Potter | 219/490 |
| 4,436,986 A | 3/1984 | Carlson | 219/505 |
| 4,504,778 A | 3/1985 | Evans | 323/323 |
| 4,549,074 A | 10/1985 | Matsuo | 411/403 |
| 4,634,957 A | 1/1987 | Hollaway | 323/242 |
| 4,668,877 A | 5/1987 | Kunen | 307/116 |
| 4,689,547 A | 8/1987 | Rowen et al. | 323/239 |
| 4,695,739 A | 9/1987 | Pierce | 307/141 |
| 4,799,126 A * | 1/1989 | Kruse et al. | 361/101 |
| 4,857,759 A | 8/1989 | Murphy et al. | 307/141 |
| 4,885,456 A | 12/1989 | Tanaka et al. | 323/237 |
| 4,902,906 A | 2/1990 | Murphy | 307/117 |
| 5,030,890 A | 7/1991 | Johnson | 315/208 |
| 5,127,045 A | 6/1992 | Cragun et al. | 379/67.1 |
| 5,264,761 A | 11/1993 | Johnson | 315/291 |
| 5,359,231 A * | 10/1994 | Flowers et al. | 307/125 |
| 5,453,899 A | 9/1995 | Page | 361/1 |
| 5,477,279 A | 12/1995 | Chang | 348/730 |
| RE35,220 E | 4/1996 | Johnson | 315/208 |
| 5,504,394 A | 4/1996 | Johnson | 315/71 |
| 5,504,395 A | 4/1996 | Johnson et al. | 315/71 |
| 5,643,012 A | 7/1997 | Mai et al. | 439/620.29 |

(Continued)

*Primary Examiner*—Tuyet Vo
*Assistant Examiner*—Jimmy Vu
(74) *Attorney, Agent, or Firm*—Jeffrey D. Myers; Peacock Myers, P.C.

(57) ABSTRACT

An apparatus and method for distributed control of an electrical appliance having a plug and a load and two power carrying conductors connecting the plug to the load, comprising locating power control elements completely within the plug, connecting interface elements to the two power carrying conductors, which interface elements are not within the plug, and transmitting status information from the interface elements to the power control elements by imposition of electrical signals onto the two power carrying conductors, wherein the electrical signals comprise an adjustable duration deadzone at a zero crossing of a sinusoidal excitation.

26 Claims, 13 Drawing Sheets

U.S. PATENT DOCUMENTS

| | | | | |
|---|---|---|---|---|
| 5,708,256 | A | 1/1998 | Montagnino et al. | 307/128 |
| 5,710,691 | A | 1/1998 | Fowler et al. | 361/94 |
| 5,731,664 | A | 3/1998 | Posa | 315/194 |
| 5,734,206 | A | 3/1998 | Keizer et al. | 307/116 |
| 5,753,983 | A | 5/1998 | Dickie et al. | 307/141.4 |
| 5,798,581 | A | 8/1998 | Keagy et al. | 307/115 |
| 5,798,620 | A | 8/1998 | Wacyk et al. | 315/307 |
| 5,844,759 | A | 12/1998 | Hirsh et al. | |
| 5,861,720 | A | 1/1999 | Johnson | 315/291 |
| 5,861,721 | A | 1/1999 | Johnson | 315/291 |
| 5,869,954 | A | 2/1999 | Kurz | 323/237 |
| 5,880,578 | A | 3/1999 | Oliveira et al. | 323/235 |
| 5,889,369 | A | 3/1999 | Roy | 315/51 |
| 5,943,198 | A * | 8/1999 | Hirsh et al. | 361/42 |
| 5,955,847 | A | 9/1999 | Rothenbuhler | 315/289 |
| 5,973,896 | A | 10/1999 | Hirsh et al. | 361/154 |
| 6,112,127 | A | 8/2000 | Bennett | 700/86 |
| 6,150,940 | A | 11/2000 | Chapman et al. | 340/568.3 |
| 6,560,079 | B1 | 5/2003 | Hirsh et al. | 361/142 |
| 6,597,590 | B2 | 7/2003 | Ikimi et al. | 363/58 |
| 6,700,333 | B1 | 3/2004 | Hirsh et al. | 315/291 |
| 6,710,553 | B2 * | 3/2004 | Logan | 315/291 |
| 7,002,264 | B2 | 2/2006 | Logan | 307/115 |
| 2003/0197625 | A1 | 10/2003 | Szuba | 315/150 |

* cited by examiner

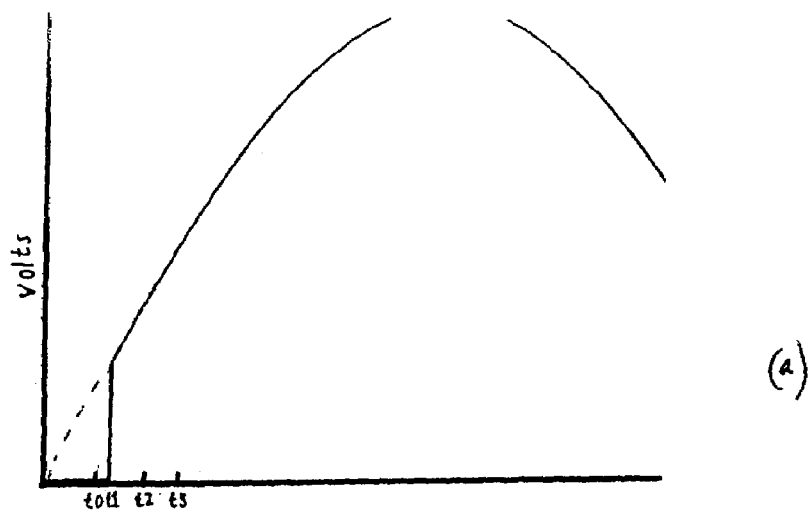
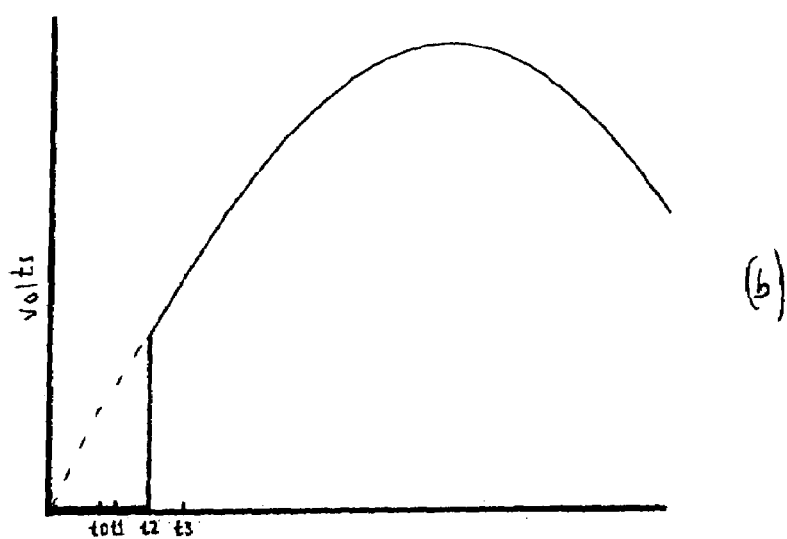
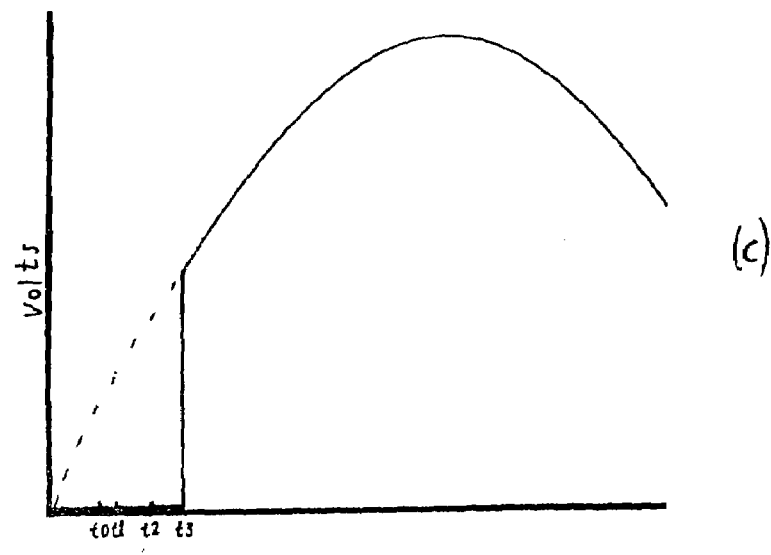
FIG. 5

CORDSET BASED APPLIANCE CONTROLLER

CROSS-REFERENCE TO RELATED APPLICATIONS

This application is a continuation-in-part application of U.S. patent application Ser. No. 09/692,892, entitled "Two-Wire Appliance Power Controller", to Stanley S. Hirsh, et al., filed on Oct. 19, 2000, issued as U.S. Pat. No. 6,700,333 on Mar. 2, 2004, and the specification thereof is incorporated herein by reference. That application claimed priority to U.S. Provisional Patent Application Ser. No. 60/160,275, filed Oct. 19, 1999, and the specification thereof is also incorporated herein by reference.

A related application entitled "Programmable Appliance Controller" is being filed concurrently herewith, to David C. Nemir, et al., Ser. No. 10/789,496 and the specification thereof is incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to an electronic control which is completely incident within a cordset plug or plug-in module, and which enables the distributed control of an appliance. User inputs are made at a remote location that is located either at the actual appliance or in-line between the appliance and the plug or plug-in module. Control signals are transferred bidirectionally via the two power conductors that connect the plug (or module) to the user input module and load. As a side benefit, electrical shock and electric arc fault protection may be provided at the power inlet to the appliance. A key feature of the invention is the way in which information is transferred via "deadzones" that are imposed upon the AC load current. If there is some current flow during a time when a deadzone should occur, this is indicative of a fault condition, either unintentional (as when an undesirable leakage path to ground occurs) or intentional (for example with faults that are deliberately applied using switch closures to impose momentary fault conditions). By controlling the deadzone times to have different lengths, then user inputs, appliance status, and other information may be sent to a remotely located controller. The technology is further adaptable to communication with a receptacle outlet, whereby information may be communicated between an appliance and a household network via control signals imposed upon the power lines.

2. Description of Related Art

Any electrical device (the "load") requires the flow of electrical current in order to operate. The electrical device receives electrical energy from one terminal (the so-called high voltage or "hot" side) of an electrical outlet or source, electrical current flows to the device through an electrical conductor or wire (the "hot conductor"), this current passes through the load and is then returned through another wire called the neutral conductor which then connects to a second power delivery terminal. The neutral conductor is said to have a "ground" potential because the neutral conductor will be electrically connected to ground at some point in an electrical distribution system.

The two wires connecting source and load may have a coating of rubber or some other electrical insulating material or they may be bare, in which case, air, which is a good electrical insulator, functions to inhibit electrical current flow outside of the wire. Since the human body can conduct the flow of electrical current, if a person comes into contact with one electrified object while simultaneously making contact with a second electrified object having a different voltage, then an electrical leakage current that is proportional to the difference will flow through the person and may cause injury or death. If the second object that a person comes in contact with is electrically connected to the earth (ground) then this condition is called a ground fault. In electrical appliances, a potential fire hazard can occur when electrical current flows across a leakage path from one electrified conductor to another, resulting in a luminous discharge. This is known as an arc (or arcing) fault.

Electrical current is the flow of electrons. Electrons are neither created nor destroyed so any functioning electrical appliance will require both an entry path for electrons and an exit path for electrons in order for the electrical current to flow. In an electrical appliance, electrons may exclusively enter on one path and exit on a second path. This is called direct current or DC operation. For most household appliances that operate from a plug, electrons will sometimes enter path one and exit path two and sometimes enter path two and exit path one. This is known as alternating current or AC operation.

Although the two conductors that deliver power to a home AC appliance in the U.S. are generally designated as "hot" and "neutral", in an AC system, the hot conductor will cyclically have a more positive voltage than the neutral for half of the time and will cyclically have a more negative voltage than the neutral for half of the time, having a momentary value of zero each time the voltage passes from positive to negative and negative to positive. The times at which the voltage potential between hot and neutral is zero is known as the voltage zero crossing. In the absence of a fault, the current flow through the two power delivery conductors will always have the same magnitude but opposite polarities. In an AC system, the current flow will vary in a sinusoidal manner, flowing in one direction into the load for half the time and in the opposite direction for half the time. When the current flow is zero, this is known as a zero crossing of current. For a load that is predominately resistive, or that is controlled to have the profile of a resistive load, the zero crossings of current will occur at the same times as the zero crossings of voltage.

In many electrical appliances and virtually all electrical distribution systems, electrical elements called fuses are employed to limit the maximum current that can be delivered. A fuse is a two terminal, two-state device that, in normal operation, acts as a short circuit. When relatively high currents are passed through a fuse, heating within the fuse causes a fusible element to open, thereby permanently interrupting power flow through the fuse and causing the fuse to permanently enter a second, "open" state. When used in an electrical appliance, fuses are sized to handle the normal operating currents that are expected to flow in the appliance. Then, in the event of an abnormal operating condition, such as a short circuit within the appliance, the high electrical currents that flow through the fuse serve to cause the fuse to go into an open circuit condition or "blow" the fuse, thereby interrupting power. For example, in an appliance that never exceeds 1 ampere of electrical current in normal operation, it might be appropriate to use a fuse having a rating of 2 amperes. The fuse will act as a short circuit during normal operation, and in the event of a so-called "fault", such as when frayed electrical conductors from a damaged cord bridge between two power conductors, the fuse will protect the appliance by becoming open.

While a fuse offers some level of protection against heavy currents in an appliance, and consequently offers protection against the electrical fires that can occur when an appliance fails, it does not offer a high level of electrical shock protection to people. The reason is that electrical currents as low as 5 to 10 milliamperes can be lethal and this level of electrical current is far below the normal operating currents in most electrical appliances. In order to protect against low level (but potentially lethal) electrical leakages, a device called a ground fault interrupt is used.

A heater is a type of electrical load that is essentially a resistor. A wire having a relatively high resistance is configured so as to transfer heat in an efficient manner—through a barrel of glass or a metal tube in an aquarium heater or curling iron; and distributed more or less evenly over a large area in a heating pad or electric blanket. As electrical current flows though the resistance of the heater, it generates heat. This heat power may be expressed in watts and is calculated as I2R, where I is electrical current in amperes and R is resistance in ohms. In the event of a damaged heating element, the load may draw less electrical current but can generate a great deal of heat in the area local to the damage. This damaged area can lead to fires or burns.

U.S. Pat. No. 3,564,203 (Naoi, et al.) discloses an automatic temperature control device for an electric blanket wherein a relay is used to regulate the electrical current applied to the blanket. The circuit requires four wires connecting the controller to the load.

U.S. Pat. No. 3,597,590 (Fleming) discloses an electronic control for a heated device in which the power is controlled to turn on at the zero crossings of the AC line, thereby minimizing radio frequency emissions.

U.S. Pat. No. 4,359,626 (Potter) discloses an electric blanket control that incorporates an capacitive "occupancy sensor" that is said to automatically remove power from the blanket if the blanket is not in use. One embodiment of this invention incorporates a ground fault interrupt safety circuit to protect against electrical leakages to ground.

U.S. Pat. No. 4,436,986 (Carlson), U.S. Pat. No. 5,451,747 (Sullivan et al) and U.S. Pat. No. 5,770,836 (Weiss) disclose an electric blanket safety circuit for PTC based heaters, that utilizes gas tubes to sense voltage imbalances caused by open or short circuits and to conduct sufficiently high currents to blow a series connected fuse. One problem with this approach is that while it protects against a catastrophic failure in the electric blanket, it will not detect or prevent lower level electrical currents that, while insufficient to blow a fuse, are high enough to cause electrical injury or electrocution. An additional problem with this approach is that it necessitates four conductors connecting between the load (the heater) and the controller. An additional disadvantage is that the approach requires that the heater load contain positive temperature coefficient (PTC) elements. An additional disadvantage is that while these designs provide some degree of electrical shock protection at the heating elements, they do not provide protection within the electrical conductors connecting controller to heater or within the electrical conductors connecting plug to controller.

U.S. Pat. No. 4,549,074 (Matsuo) discloses a temperature controller incorporating a rapid initial heat. The invention is electronically complicated and requires five electrical conductors attaching the electric blanket to the controller.

U.S. Pat. No. 4,885,456 (Tanaka et al.) discloses a temperature controller whereby a thyristor is controlled to deliver power to a load immediately prior to a zero crossing of the AC line, thereby avoiding electromagnetic noise interference.

U.S. Pat. No. 5,708,256 (Montagnino et al.) discloses a heating pad controller with variable duty cycle for temperature adjustment.

U.S. Pat. Nos. 5,844,759, 5,943,198 and 5,973,896 (all to Hirsh et al.) describe a solid state ground fault and arc fault detection and interruption technology for an electrical appliance that has two parts, one part which resides in or near the load (the load conditioner) and a second part which is located at or near the plug. The load conditioner injects a deadzone in the current flow during each half wave AC cycle. A sensing circuit in the plug looks for the presence of that deadzone each half cycle. If there is leakage around the load conditioning module (indicating a ground fault or arcing fault) this is indicative of a potentially dangerous electrical condition and the current flow is interrupted at the plug. U.S. Pat. No. 6,560,079 B1 (to Hirsh et al) further extends this technology to the detection of transposed AC conductors (i.e., neutral and hot conductors are swapped) or to the detection of an open ground condition in a grounded appliance.

The present invention is preferably designed for use in an appliance cord for AC appliances. In its preferred embodiment, it is a two part system. The electrical interruption means and primary control are located within the plug. User inputs are more conveniently located either at the load or within an in-line control module. User inputs, including the adjustment of switch position and/or momentary button presses, are encoded into signals that are superimposed upon the AC line and that can be intercepted and interpreted at the control electronics within the plug, whereupon, the control electronics within the plug actually implement appliance control functions including power settings, initial heat-up, and automatically shut off. In addition, this two part system may be used to provide electrical ground fault protection and electrical arc fault protection within the appliance. The same two bidirectional communications approach may also be used between the appliance and a transceiver located in a wall outlet, thereby allowing status and control information to be passed from appliance to a home network.

BRIEF SUMMARY OF THE INVENTION

The present invention is of an apparatus and method for distributed control of an electrical appliance having a plug and a load and two power carrying conductors connecting the plug to the load, comprising: locating power control elements completely within the plug; connecting interface elements to the two power carrying conductors, which interface elements are not within the plug; and transmitting status information from the interface elements to the power control elements by imposition of electrical signals onto the two power carrying conductors, wherein the electrical signals comprise an adjustable duration deadzone at a zero crossing of a sinusoidal excitation. In the preferred embodiment, the status information includes switch state, temperature, light, sound, vibration, and/or presence of an electrical fault. The power control elements are controlled in response to the status information, and comprise one or more thyristors and/or transistors. The interface elements are preferably resident in a module that is located between the plug and the load, and the interface elements may be located adjacent to the load. The power control elements preferably can interrupt power to the load. The interface elements comprise switches, push buttons, potentiometers, and/or light emitting devices. The load can be an incandescent light, electric blanket, heating pad, electric iron, fan, or aquarium heater, for example. Preferably, if the status information indicates presence of an electrical fault, power is interrupted by means of the power control elements.

The invention is also of a network appliance control apparatus and method for an appliance having a power cord and a plug, comprising: locating power control elements completely within the plug; and controlling the power control elements to impose electrical signals onto the prongs of the plug. In the preferred embodiment, the invention permits detection of the electrical signals with monitoring electronics within a receptacle outlet, which outlet may be part of a building control network.

The invention is further of an appliance control apparatus and method for an appliance having a power cord and a plug, comprising: locating power monitoring elements and power control elements completely within the plug; and detecting via the power monitoring elements an external power interruption. In the preferred embodiment, the power interruption is used to convey control signals to the power control elements. Patterns of power interruptions are preferably used to convey control requests.

The invention is additionally of an appliance control apparatus and method employing a module insertable into a receptacle outlet and into which an appliance is plugged, comprising controlling the appliance and transmitting status information to and/or from the appliance by imposition of electrical signals onto two power carrying conductors, wherein the electrical signals comprise an adjustable duration deadzone at a zero crossing of a sinusoidal excitation. In the preferred embodiment, power control electronics are resident in the module and are responsive to signals imposed upon the power carrying conductors.

The present invention has the following objects and advantages:

a) it is a distributed control with the power control located remotely from the user inputs;

b) it has a continuum of power settings;

c) it can offer controlled schedule features such as warm-up and automatic off;

d) it can offer protection from electrical ground faults anywhere in the appliance cord, from the plug forward, and anywhere within the load;

e) it can offer protection from electrical arcing faults;

f) it has a low level of electromagnetic emissions;

g) it can offer autocompensation for source voltage fluctuations;

h) it can be used with a fusible link to get reliable power interruption, even in the case of high fault currents;

i) it can use load feedback information for load regulation;

j) it can detect broken conductors in a PTC heater;

k) it can communicate status and control information bidirectionally from control point to remote user input point;

l) it can communicate status and control information from the attached appliance into a home control network via the two power delivery wires;

m) the control portion may be disposed completely within a plug cap; and n) the control portion may be completely disposed within a plug-in module.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 5 depicts a half wave of an AC waveform with variable deadzones.

LIST OF REFERENCE NUMERALS

Figure 1:
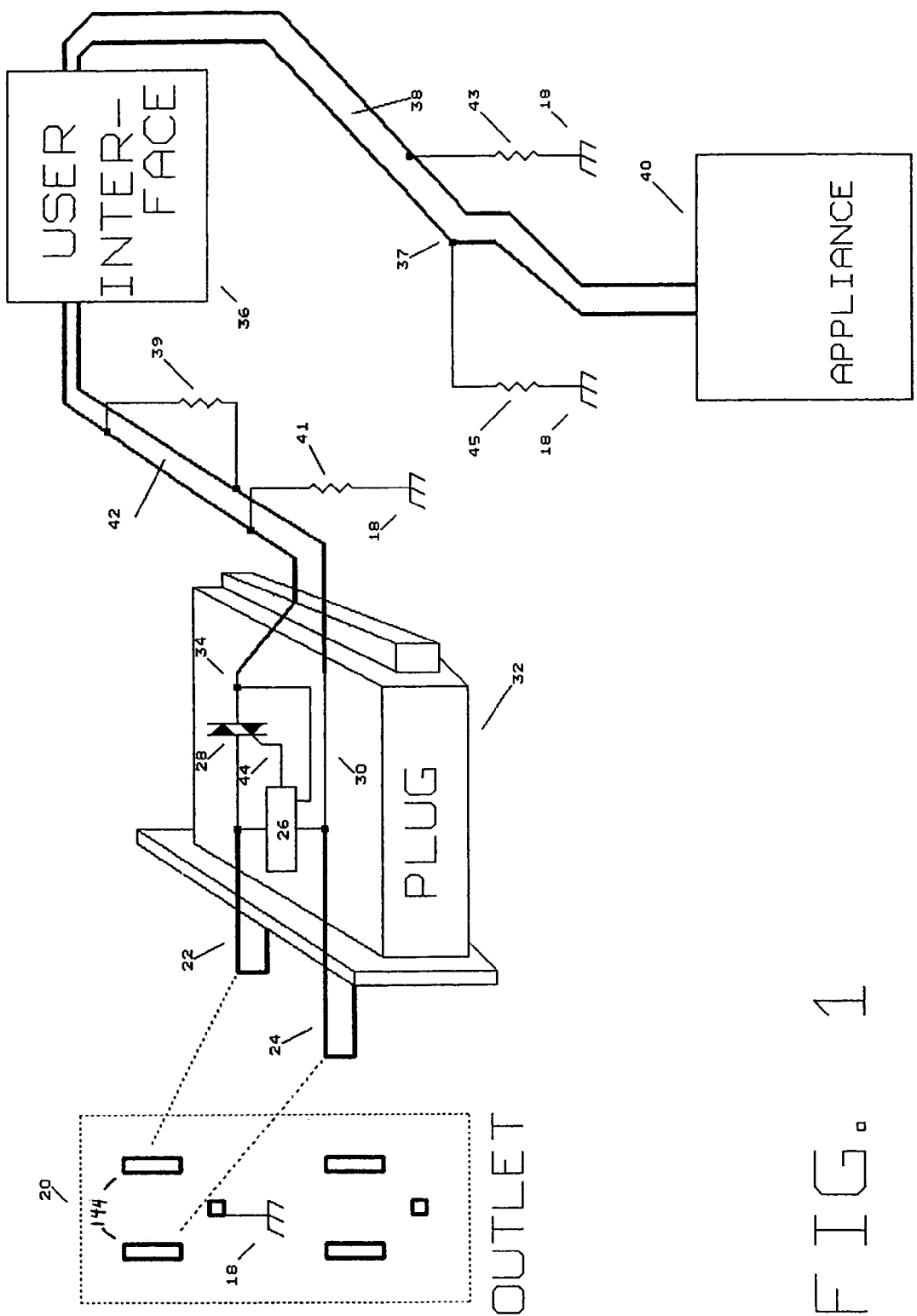
FIG. 1 is a block diagram depicting the distributed control system of the present invention.

20—Electrical outlet
22—Hot prong of plug
24—Neutral prong of plug
26—Controller
28—Thyristor
30—Neutral line
32—Plug
34—Ungrounded output from plug
36—User interface module
37—Neutral conductor out of controller into appliance
38—Conductors connecting user interface to appliance load 39—Parallel arc fault
40—Appliance load
41—Ground fault
42—Conductors connecting plug to user interface
43—Ground fault
44—Gate of thyristor
45—Ground fault
46—Negative half cycle
48—Positive half cycle
50—Zero crossing of AC line
52—Dead zone imposed at zero crossing of AC line
54—Microcontroller
56—Fuse
58—Power supply resistor
60—Power filter capacitor
62—Series sensitivity resistor
64—Shunt sensitivity resistor
66—Input limiting resistor
68—Gate current limiting resistor
70—Power bleeder resistor
71—Hot out conductor
72—Thyristor in user interface
74—Momentary push button (N.O.)
76—Fault resistance used for on/off function
78—Thermal sensing element
80—Zener diode
82—Adjustable shunt regulator
84—User interface potentiometer
86—Calibration resistor
88—Calibration resistor
89—Series switch
90—Bridge rectifier diodes
91—Positive half cycle steering diode
92—Power supply resistor
93—Negative half cycle steering diode
94—Pilot LED
96—Current limiter resistor for LED
97—Charge storage capacitor
98—Capacitor
100—Capacitor
101—Current sensing resistor
102—PTC heater
104—Hot conductor in heater
106—Neutral conductor in heater
108—PTC material
110—PTC heating pad with 4 inputs
112—H2–H1 dropping resistor
114—Break in H1–H2 conductor
116—N2–N1 dropping resistor
118—Hot side optocoupler
120—Neutral side optocoupler
122—Capacitor
124—Junction Field Effect Transistor (JFET)
126—Transistor
128—Limiting resistor
130—Blocking diode
132—Inductor
134—Capacitor
136—Monitoring Electronics
138—Network Connection
140—In-plug communications control line
142—Plug module
144—Entry holes in receptacle outlet
146—Power conductors

DETAILED DESCRIPTION OF THE INVENTION

The present invention is of a method and apparatus for AC appliance control preferably utilizing a minimum of electrical conductors connecting between plug and a user control module and between the user control module and the load. Information is transferred bidirectionally via "deadzones" that are imposed upon the AC load current. In some embodiments, if there is some current flow during a time when a deadzone should occur, this is indicative of a fault condition, either unintentional (as when an undesirable leakage path to ground occurs) or intentional (for example with faults that are deliberately applied using switch closures to impose momentary fault conditions). In other embodiments, by controlling deadzones of AC power to have different lengths, then user inputs, appliance status, and other information may be sent to a remotely located controller or to other locations in the appliance or cordset, without the requirement for additional power conductors. By imposing signals upon the power line at the plug, information may be passed to the receptacle into which the appliance is plugged. Through a toggle of power at the receptacle, information may be passed to the appliance, thereby resulting in a bidirectional flow of control and status information from the appliance into a home network.

FIG. 1 depicts a block diagram of the distributed control system of the present invention. The appliance power cord plug 32 is configured to be inserted into a wall outlet 20 in order to deliver power to the appliance. In the U.S., one of the socket inputs on a three conductor outlet is electrically tied to earth ground. This is denoted as 18. Power delivery to the appliance 40 is controlled from within the plug 32 by means of the control of thyristor 28. Controller 26 is resident within the plug 32 and determines when to turn on thyristor 28. Controller 26 turns on thryristor 28 by means of a control voltage applied to thyristor gate 44.

A user interface 36 is shown as located between the plug 32 and appliance 40. Although all or part of this user interface may be located within the appliance 40 or within the plug 32, its exact location does not impact the theoretical underpinnings of the present invention. The user interface 36 is the means by which the user may set and adjust control actions that govern the appliance. The user interface 36 may contain one or more audio indicators (such as a buzzer) or visual indicators (such as LED's or neons) that can indicate the state of the appliance 40 or control actions implemented at the plug 32. One of the roles of the user interface 36 is to impose a so-called "deadzone" at the zero crossing of the AC line, the deadzone being an adjustable duration interval during which there is negligible power transmission. This deadzone provides a means by which appliance status information may be passed from user interface 36 to the controller 26. Information is encoded by the deadzone length.

In FIG. 1, various possible fault conditions are depicted where electrical leakages could result in electrical shock or electrical fire. A parallel arc fault 39 is depicted as an electrical leakage path between the hot 34 and neutral 30 conductors. Ground faults 41, 43, and 45 are electrical leakage paths from the electrical conductors to ground 18. In normal operation, none of these faults will be present. The faults depicted in FIG. 1 represent anomalous operating conditions. They are abnormal operating conditions.

The conductors 38 connecting the user interface 36 and the appliance load 40 will consist of at least two separate conductive paths to deliver power to the appliance load 40. Although the user interface 36 and the appliance load 40 are depicted in FIG. 1 as being physically separate and connected by conductors 38, in some embodiments, the user interface 36 and appliance load 40 might be physically combined into a single package.

Figure 2:
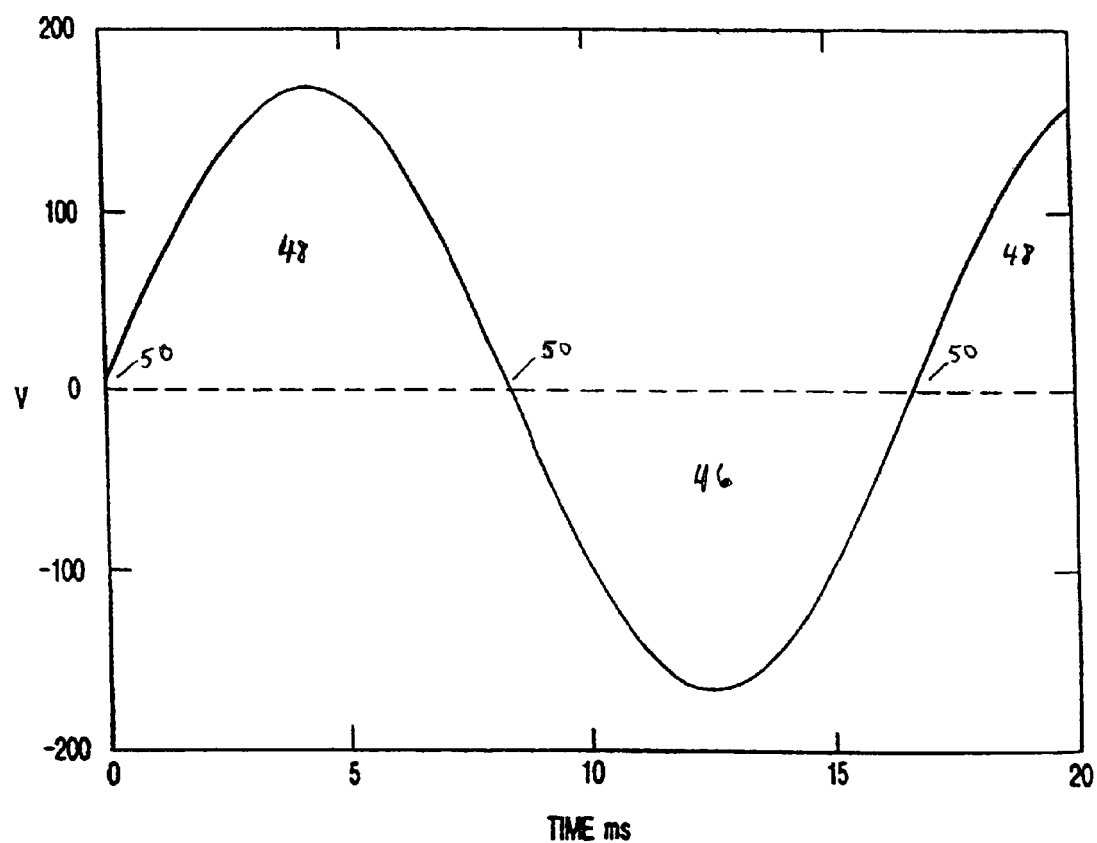
FIG. 2 depicts an AC sinusoidal waveform.

FIG. 2 depicts an AC waveform as delivered from the outlet 20 to the two prongs 22 and 24 on the plug 32 in FIG. 1. In the United States, this AC waveform is a 60 Hz sinusoid with an nominal peak value of 170 volts, corresponding to an RMS value of 120 volts. The zero crossings 50 of the AC lines are those points where the value of the voltage changes from positive (region 48) to negative (region 46) or from negative to positive, momentarily having a value of zero.

Figure 3:
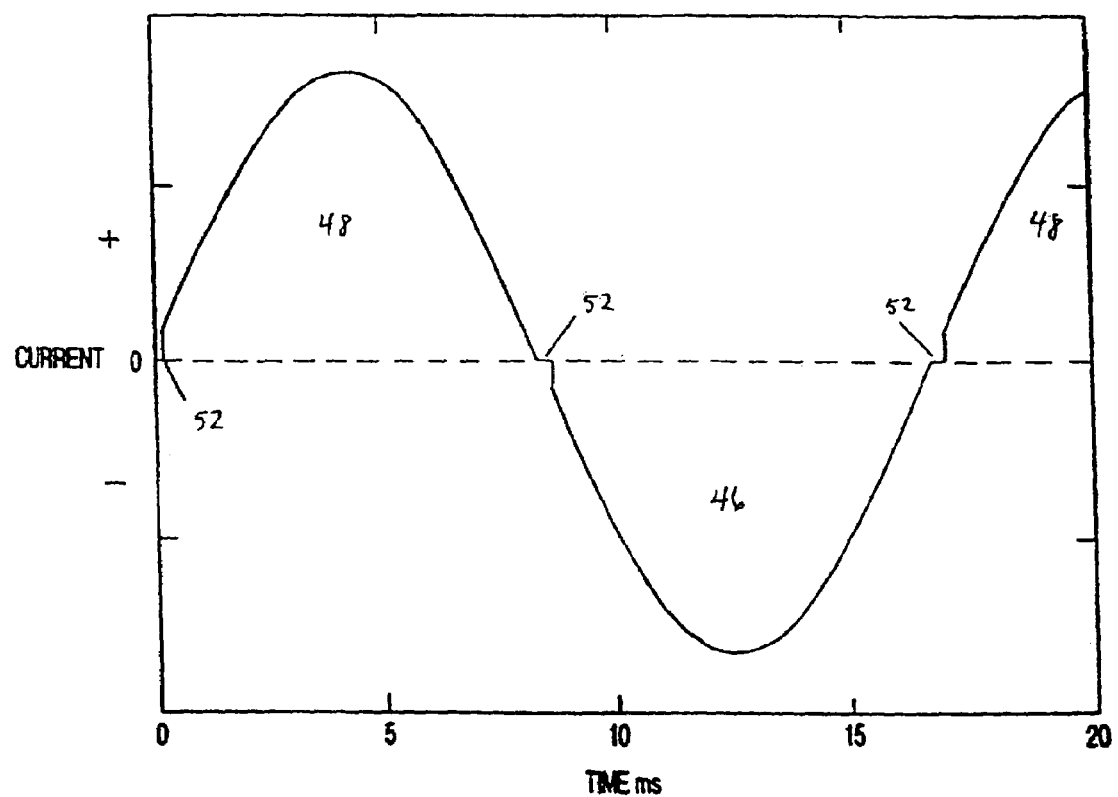
FIG. 3 depicts an AC sinusoidal waveform with deadzones imposed after zero crossings.

FIG. 3 depicts an AC waveform with a dead zone 52 imposed at each zero crossing of the AC line. This is the voltage that might be seen at the ungrounded or hot output 34 from the plug (as per FIG. 1), as measured relative to the grounded (neutral) conductor 30. This dead zone 52 may be imposed by controlling the gate 44 of thyristor 28 to be in an off state for some desired time period after each zero crossing of the AC line.

Figure 4:
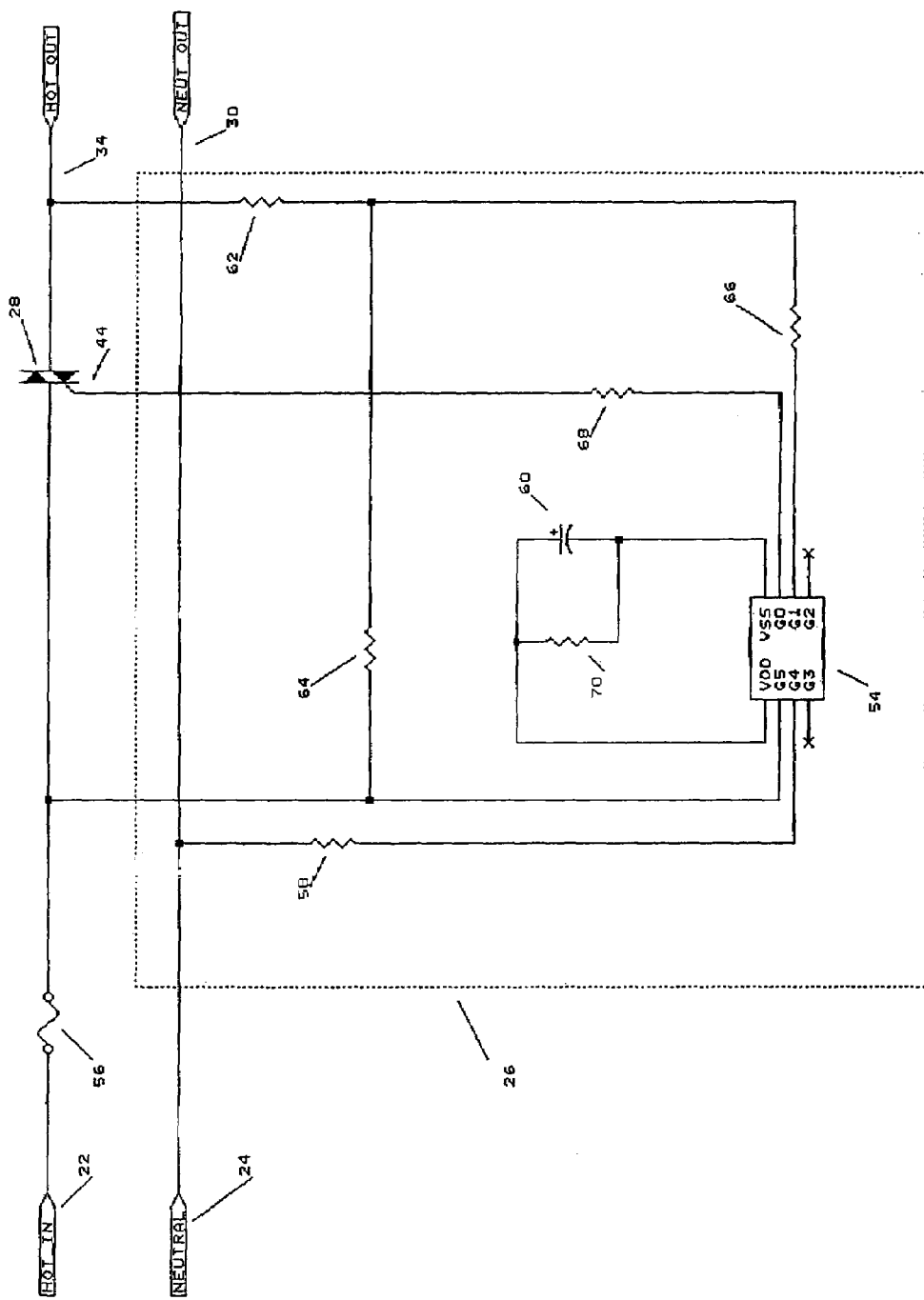
FIG. 4 depicts a specific embodiment of a microcontroller based controller.

FIG. 4 depicts one preferred embodiment for the controller 26. The controller 26 consists of microcontroller 54, which is an integrated circuit that carries out the control tasks. In the present preferred embodiment, the microcontroller 54 may be a PIC12C508 style microcontroller manufactured by the Microchip company. Resistor 58 is a power supply resistor which furnishes power to the microcontroller directly from the neutral line 24. Internal clamping diodes within the microcontroller 54 serve to rectify incoming power in order to develop DC power as described in co-pending application Ser. No. 09/692,892. Capacitor 60 serves to filter the power supply. Resistor 62 is a series sensitivity resistor and 64 is a parallel sensitivity resistor. The ratio of these resistors may be used to set the fault sensitivity. The microcontroller 54 measures voltages with respect to the voltage potential at the hot prong 22. When the voltage level of the hot and neutral are the same, the microcontroller 54 determines that the AC line voltage is at the zero crossing, and starts timing all events from this point. As the neutral conductor 30 swings either high or low relative to the hot conductor 22, the microcontroller 54 determines which half cycle the AC line is entering, and begins looking for a voltage to be developed across the parallel sensitivity resistor 64. When a logic level of the same value as that of the neutral conductor 30 is reached, the microcontroller 54 determines that there is conduction in the load.

The time between the occurrence of a zero crossing and the time at which there is conduction in the load is measured by the microcontroller 54 and based upon this information, a number of operating conditions may be identified and responded to. For example, from FIG. 1, if a fault 39 is present, then this fault will represent a path for conduction, even though there is a circuit in the user interface 36 that is imposing a dead zone. Accordingly, the dead zone will be very brief or nonexistent and this is indicative of a fault. Referring to FIG. 4, if it is so-programmed, the microcontroller 54 only fires the gate 44 of thyristor 28 in the absence of a fault, thereby allowing the flow of electrical current to the hot conductor 34 for the remainder of the half cycle. In a similar manner, on the subsequent half cycle, in the absence of a fault condition, thyristor 28 will be fired. In some embodiments, it may be desirable to prevent any firing of the thyristor 28 at any time subsequent to the detection of a fault condition. Alternatively, it may be desirable to prevent any firing of the thyristor 28 for some integral number of half cycles subsequent to the detection of the most recent fault.

After every zero crossing, the time from the zero crossing to the conduction point is measured to determine if the interval constitutes a ground fault 41 or parallel arc fault 39 or constitutes a normal load conditioning interval or even a series arc fault. A series arc fault occurs when a conductor, such as conductor 34, is broken or frayed, in which case, the connection is intermittent and occasionally will be detected as an excessively long dead zone. An interval too short to be a load conditioning interval is considered to be a ground fault or parallel arc fault. An interval that is too long may be considered to be a series arc fault. As will be discussed in conjunction with FIG. 6, rather than a series arcing fault, very long dead zones may be indicative of a series control switch which is open and the opening interval (number of long deadzones) between switch closures and the number of switch closures can serve as a means of communicating control information.

Fuse 56 is a fusing element that serves to open up upon the application of excessive electrical current, thereby offering some degree of protection in the event of a short circuit condition either in the appliance 40 or between the conductors connecting the appliance 40 to the plug 32. A fault is generally caused by a high resistance leakage path such as a person or a carbonized trace, and these faults will be sensed and will result in the removal of power via the thyristor 28. However, for a low resistance fault such as a direct short circuit across conductors, a very large electrical current will flow and this current can damage the thyristor 28, rendering it inoperable and unable to interrupt current. In order to avoid this event, the fuse 56 should be sized so that it has an $I^2 t$ rating that is less than the rating of the thyristor. In that way, excessive currents will cause the fuse 56 to open, thereby protecting the thyristor 28 and the rest of the circuit and interrupting power flow to the load. Since the fault sensing circuit of the present invention can be relied upon to interrupt all but the very heaviest fault currents, this allows a great deal of flexibility in the choice of the fuse 56 and in some embodiments, it may be sufficient to have a fusible link such as a very thin printed circuit board trace.

By deliberately introducing a fault by means of a momentary switched resistance to ground, this condition can be recognized as a power toggle control without interfering with normal fault interruption. In other words, a deliberately induced fault may be used as a means of communicating control information. The normal load conditioning interval can be divided into user settings, with any or some of the settings being off, or some power or duty cycle settings, or lamp dimming level. If the interval is too long to be considered to be a normal load, then it is recognized as an arc fault and the microcontroller 54 may process this type of fault by completely shutting down or by staying off for a predetermined interval. Additionally, the microcontroller 54 may determine if a fault or dead zone occurred within the positive half cycle or the negative half cycle, and can respond differently to each situation in different ways. For example, a fault in only the negative half may toggle a special mode A, while a fault in only the positive half may toggle special mode B. Then a fault in both half cycles may be only a fault, or may toggle power on and off (with the determination of whether it is a fault or a control action left to be decided by the microcontroller 54). Similarly, the polarities of the zero crossings prior to each dead zone may be used for different functions. For example, dead zones after a positive going zero crossing may be used for the user interface, while dead zones after a negative going zero crossing may be used as feedback for appliance information for closed loop control.

Since the microcontroller 54 controls the power thyristor 28, it can apply information which the user interface is able to receive. It can for instance control the interval between the conduction in the load (dead zone time) and the firing of the thyristor 28 which is phase control, or it can apply duty cycle control of the load. This information can be different for each half cycle, so many communication protocols are possible. In this way there are bidirectional communication paths between the plug 32 and the user interface 36, as well as the appliance 40 and the plug 32. Since the appliance 40 may feed information back to the plug 32, the user interface 36 may also receive this information and use it for status indicators, or for control refinements.

In FIG. 4, the microcontroller has an internal clock and times events relative to the zero crossings of the AC line. If power is removed from the source, that is, the voltage between plug prongs 22 and 24 goes to zero for a significant period of time, then this event is recognized because there are not periodic zero crossings. With the correct selection of resistor 70 and capacitor 60, the microcontroller 54 can maintain power for a period of time ranging up to several seconds. Accordingly, the microcontroller can detect power interruptions/restorations from monitoring the incoming power. This is a means for the microcontroller to receive information from the power outlet. For example, if an outlet is controlled from a room wall switch, then power can be turned off and on by that switch. So, the microcontroller could be programmed to control dimming at a lamp. For example, the first time that power is applied after having been off a long time ("long" being defined as long enough for capacitor 60 to discharge enough so that the microcontroller 54 goes through a start-up sequence when power is applied), the microcontroller 54 controls the thyristor 28 to be fully on and the attached lamp would receive full power and be in a full bright condition. Then if the outlet power is switched off, then on, this could cause the microcontroller 54 to control the thyristor 28 to apply half power to the lamp. Then another switch transition could be interpreted as a command to reduce brightness still further, perhaps using phase control to reduce lamp power to 25%. Accordingly, power disruptions at the wall outlet could be sensed and interpreted as appliance control commands by the microcontroller 54 in the plug 32. In a similar way, if the wall outlet is under remote control from a home control network, momentary power toggles at the outlet could be used to transmit information to the appliance.

FIG. 5 depicts a positive going AC voltage as seen at the output of the plug 32, between conductors 30 and 34 (refer to FIG. 1). When used with a fault detection capability, the controller 26 in FIG. 1 always controls the thyristor 28 to delay firing until time t0. During that interval from the zero crossing to t0, if the controller 26 detects a sufficiently high voltage across a sensitivity resistor (discussed later in conjunction with FIG. 6) this is indicative of a fault condition and the controller 26 does not turn on the thyristor 28 at any time during the balance of the half cycle. If, after time t0, no fault has been detected by the controller 26, then the thyristor 28 is enabled by continuously applying gate pulses at the thyristor gate 44 for the balance of the half cycle. However, this does not mean that the load is receiving current.

For fault protection, an additional load conditioning element that is located further upstream must be enabled before power is delivered to the load. This element inhibits power flow until sometime after thyristor 28 is fired (since there is no energy available to turn it on). The length of time that elapses before this upstream load conditioning module is turned on is a means by which information may be encoded at the user interface module and detected by the controller 26.

FIG. 5 depicts three different delay times that could correspond to three different control settings of the load conditioning element. If the load conditioning element causes a delay to t1 before allowing current to flow (equivalently, before allowing the voltage between conductors 34 and 30 to become appreciable), then this corresponds to some setting #1. If the electronics in the user interface causes a delay to t2 before allowing current to flow, this corresponds to a different setting #2. The same applies to t3 and a setting #3. Accordingly, in this example, there are three possible settings that can be conveyed between the user interface module 36 (see FIG. 1) to the controller 26 at each half cycle. Depending upon the speed and accuracy with which the microcontroller can make measurements and the maximum desired delay, the system could be designed to transmit one of N possible settings at the beginning of each half cycle, where N is an arbitrary integer. This is the basis for a low bit rate communication scheme.

Figure 6:
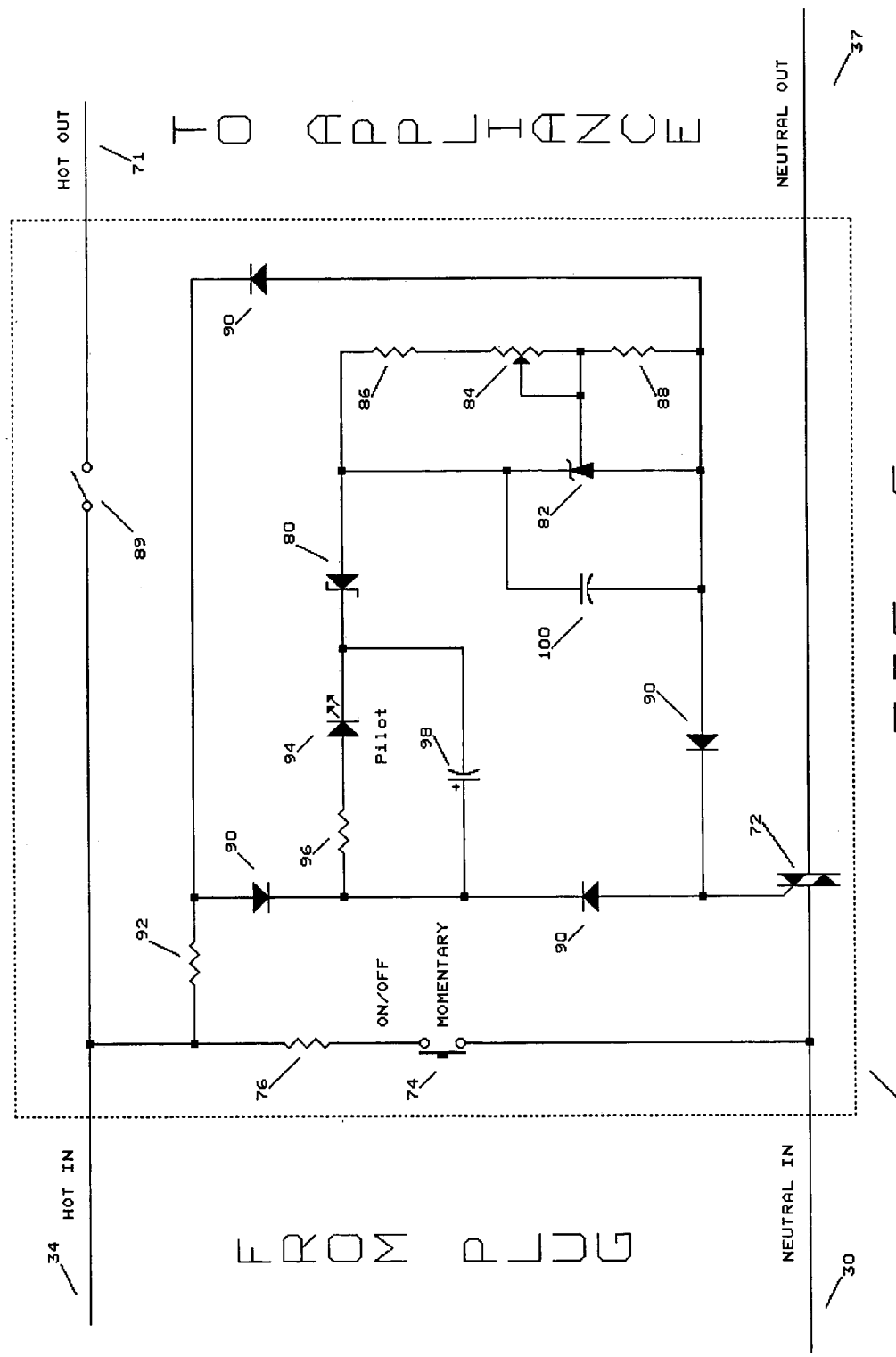
FIG. 6 depicts one specific embodiment of a user interface module.

FIG. 6 depicts one specific embodiment of the user interface 36. In this embodiment, thyristor 72 is used to control conduction in the load to impose a dead zone. Hot conductor 34 and neutral conductor 30 come from the plug (32 in FIG. 1). The appliance load (40 in FIG. 1) is connected between the neutral out 37 and the hot out conductor 71. A resistor 76 and momentary pushbutton 74 are connected in series between the conductors coming from the plug. When the button 74 is pressed, a low level fault is detected within the plug (32 in FIG. 1). This happens because it allows a current flow path around thyristor 72. The momentary pushbutton can serve as a simple test fault, and can also be used as part of the user interface 36, in which case, it serves as an on/off toggle control. Power supply resistor 92 limits gate current for thyristor 72. Four diodes 90 form a bridge rectifier with the AC inputs connected to the gate of the thyristor 72 and the power supply resistor 92. The remainder of the circuit is connected to the DC output of the bridge. By adjusting the conduction point on the DC side of the bridge, the conduction point or dead-zone is controlled for both half cycles of the AC line. When the DC side of the bridge is not conducting, there will be no gate current to the thyristor 72. Once current flows on the DC side of the bridge, this current is conducted through the gate of thyristor 72 and power supply resistor 92, establishing gate current to fire thyristor 72. Very low current levels, although too low to fire the thyristor 72, can be detected by the plug 32 as the end of the dead-zone. Initially the dead-zone is established with this low current, but once the thyristor 28 in the plug is fired, there will be ample current through the power supply resistor 92, the diode bridge 90, and the gate of thyristor 72 to fire thyristor 72.

On the DC side of the diode bridge 90, an adjustable threshold voltage is established. This adjustable threshold voltage adjusts the dead-zone timing. From the positive side of the bridge is shown the pilot LED 94 and current limiting resistor 96 with paralleled filter capacitor 98. When the load is energized from the plug 32 even after thyristor 72 has been fired, current will continue flowing through resistor 92, diodes 90, and the gate of the thyristor 72. This current charges capacitor 98 and lights the pilot LED 94. During the dead-zone and when the load is not energized, capacitor 98 serves to reduce flicker in the pilot LED 94. Zener diode 80 serves to establish a minimum dead-zone for the circuit. A simple user interface could be composed of a series string of zeners and switches which shunt or connect various combinations of zeners to provide various dead-zones.

A continuously adjustable dead-zone is realized using a type 431 adjustable shunt regulator 82. This shunt regulator will operate at low currents, and functions as an adjustable zener diode. It incorporates an internal temperature compensated reference. The reference input to the shunt regulator is connected to the wiper of the user interface potentiometer 84. Whenever the voltage applied to the reference input is greater than the internal reference voltage (about 2.5 volts) the shunt regulator will conduct and provide a low impedance between its cathode and anode. If the voltage applied to the reference input is lower than the internal reference voltage, the shunt regulator will act as a very high impedance, and almost no current will flow between the cathode and anode. Calibration resistors 86 and 88 serve to establish the minimum and range of the dead-zone respectively. The shunt regulator 82 is able to adjust its shunt voltage between 2.5 volts and 35 volts. Capacitor 100 is used to stabilize or smooth the shunt regulating voltage which is added to the minimum voltage established by zener diode 80. When the circuit is initially powered on, capacitors 98 and 100 will have no charge, so that the minimum dead-zone voltage is provided by zener diode 80, and no fault is detected. Once the load is energized, then capacitors 98 and 100 will retain some charge, and an adjustable dead-zone is established. Referring to FIG. 1, the controller 26 in the plug 32 will then measure the length of the dead-zone and can interpret it as corresponding to a fault or to a specific setting of the user interface potentiometer 84.

The circuit in FIG. 6 does not have discrete steps, but is continuously adjustable. This control is over an absolute dead-zone voltage with respect to the instantaneous voltage applied to the circuit. This circuit can compensate for changes in line voltage. For a resistive heating element, the power of the heater will change with respect to the square of the voltage. For example, if the applied voltage is changed by 10%, then power output of a resistive heater will change by more than 21%. So, if a power level less than 100% is selected using potentiometer 84, and positions of the potentiometer 84 are marked to be 10% apart, then selecting a nominal setpoint of 70% may give an actual power output of 50% to 90% depending upon the line voltage since power output is assumed to be by duty cycle power control. To compensate for line voltage changes, a controller would need to select lower power duty cycles for higher line voltage, and higher power duty cycles for lower line voltages. Fortunately, for resistive heater type loads, the circuit of FIG. 6, together with the circuit of FIG. 4 is able to automatically compensate for line voltage changes as follows. First, the microcontroller 54 is programmed to select higher power settings for longer dead-zone delays, and lower power settings for shorter dead-zone delays. The microcontroller 54 controls power to the appliance 40 by on-off duty cycling. Since the circuit in FIG. 6 adjusts dead-zone timing via the set point of the adjustable shunt regulator 82 and zener diode 80, the timing of this set point will vary with slope of the input sine wave. For higher line voltages, the slope is steeper, and the set point will be reached earlier. For lower line voltages, the slope is more gradual, and the set point will be reached later. Because the set point is reached earlier for high line voltages, the microcontroller 54 will determine that a lower power setting is selected. For lower line voltages the set point is reached later, and so the dead-zone is longer. The microcontroller 54 will then select higher power duty cycling. In this way, the circuit will have selectable power rather than selectable duty cycle. If maximum power is selected, the circuit will be able to limit this power for high source voltages, but will only be able to provide what power 100% duty cycle provides for low source voltages. This problem can be eliminated by only allowing 100% duty cycle for low source voltage, but for normal or high line voltage the user interface module's 36 control limit is controlled to be less than 100%. For example, in the case of a heating element, the user may have control up to about 50 watts, but the actual heating element may be capable of 60 watts at normal line voltage. This is one way in which power delivery to a load may be compensated for variable source voltages.

In FIG. 6 user interface module 36, power settings are controlled by potentiometer 84. This results in a variable dead zone which is measured by the microcontroller 54 in FIG. 4. By measuring the deadzone time, the microcontroller 54 can indirectly read the potentiometer setting. Even though the potentiometer 84 is a continuous device, the microcontroller can only measure discrete time intervals. Using a dead zone designed to have one of eight possible lengths (depending upon pot setting), the controller can still give a wide range of heat settings. The reason for this is that there are variable factors that affect the timing and these result in jitter in the time measurements. For example, suppose that potentiometer 84 is marked for eight positions. Position 6 always results in a measurement of discrete value 6 ticks. Position 5 always results in a measurement of discrete value 5 ticks. If the user moves the potentiometer 84 to a position halfway between 5 and 6, then the measurement at the microcontroller 54 will be 5 ticks half the time and 6 ticks for half the time. Then the microcontroller implements the heating schedule corresponding to 5 ticks for half the time and implements the heating schedule corresponding to 6 ticks for half the time and the net effect is to get a heat output that is halfway between a setting of position 5 and position 6. In a similar way, a potentiometer position that is one quarter of the way between 5 and 6 might yield a heating profile that is closer to a 5 than to a 6. So, the result is a continuously variable heating control even though the microcontroller measures the length of the deadzone with a finite resolution.

As discussed in conjunction with FIG. 5, in some embodiments, a certain amount of the dead zone is dedicated to determining whether a fault is present. If no fault is present, then the length of the deadzone is the means by which status information may be transmitted inexpensively over the two wires that deliver power to the appliance. For a heater, the deadzone length may be used to transmit a user setpoint from the user interface, which may be located between the plug and the appliance or may be built into the appliance itself, to a remotely located controller in the plug. However, other information may also be transmitted by using deadzone length. Since the controller in the plug can distinguish between positive half cycles and negative half cycles, the deadzone length technique can serve as a mechanism to transmit data bidirectionally in an appliance. For example, in a heater, on positive half waves, the deadzone length can correspond to a user setpoint while in negative half waves, the deadzone length encodes the actual sensed temperature. In this way, one polarity (the positive half cycles in this example) is used for control while the other polarity (the negative half cycles in this example) is used for feedback. The deadzone may also be used to encode a composite of set point and feedback information so that multiple items of information are incorporated into the deadzone of every half cycle. For example, in FIG. 6, resistor 86 could be replaced by a temperature sensing element called a thermistor, which exhibits a variable resistance in response to temperature. Then the deadzone length is a function of both potentiometer 84 setting as well as temperature.

In FIG. 6, a series switch 89 may be used to interrupt power to the load. Referring to FIG. 4, this "open load" condition can be sensed by the microcontroller 54 because there will be no potential difference between the two sides of resistor 64, or equivalently between conductors 22 and 34. By counting the number of AC half cycles that the open load persists (equivalently, that the switch is in an open or high impedance state), and/or by counting the number of switch closures in a given period of time, control information can be conveyed remotely from the switch 89 (FIG. 6) to the microcontroller 54 (FIG. 4). A single series switch alone can serve as the means for transmitting a limited amount of control information. One example is a lamp control whereby switch closures at the lamp signal to the control in the plug that various dimming schedules are to be implemented. In such a case, the user control module is considered to be the switch in the lamp and is resident in the appliance (in this case the lamp).

Figure 7:
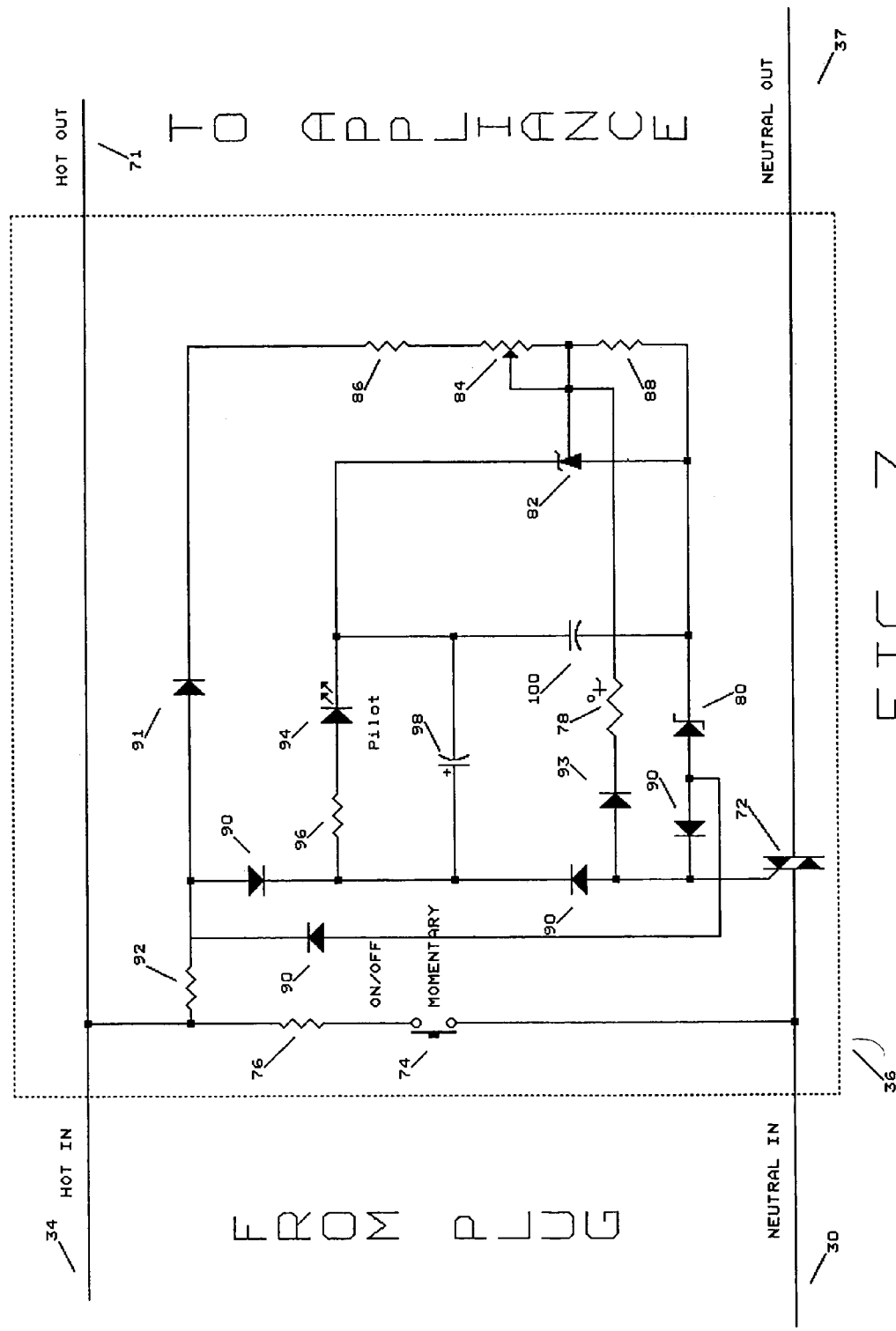
FIG. 7 depicts a second specific embodiment of a user interface module whereby temperature information may be encoded upon the deadzones.

FIG. 7 depicts a user interface module that uses the positive half cycle deadzone to encode user setpoint information and that uses the negative half cycle deadzone to encode temperature information. Thermal sensing element 78 exhibits a variable resistance (or equivalently, a variable voltage) according to temperature. During a positive half cycle, the circuit in FIG. 7 operates identically to the circuit of FIG. 6. During these positive half cycles, the negative half cycle steering diode 93 serves to block the influence of thermal sensing element 78 and removes its influence from the deadzone. In a similar way, during the negative half cycle, the positive half cycle steering diode 91 serves to remove the influence of the potentiometer 84 and calibration resistor 86 from the deadzone determination. It should be noted that in this example, either the thermal sensing element 78 must be located within the appliance whose temperature is being controlled or is used to measure a remote ambient temperature. Although this discussion has been directed at temperature, the thermal sensing element 78 could be replaced by a measuring means for some other phenomena such as light, sound, vibration or other sensed parameters and would yield a similar type of control.

Figure 8:
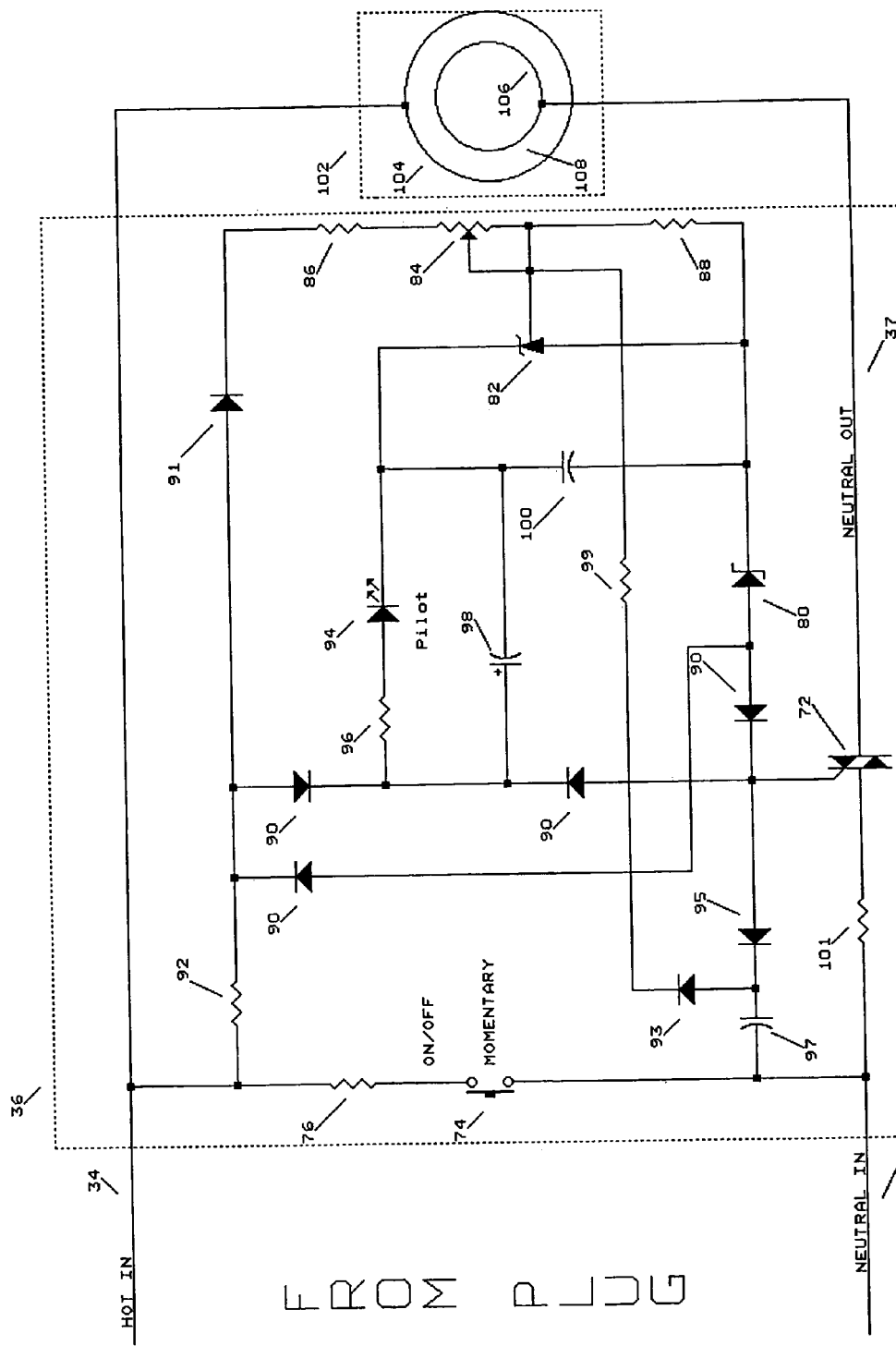
FIG. 8 depicts a specific embodiment of the user interface module attached to a PTC heater wherein a break in the heater wires may be detected as a fault.

FIG. 8 depicts a heater controller that uses temperature feedback from a PTC style heater 102. In this implementation, the user interface module is located in close physical proximity to the heater 102 to comprise the appliance. For this type of electrical load, the heating element 108 is constructed from a material that exhibits a positive temperature coefficient (PTC) response. That is, as temperature increases, the resistance of the PTC material also increases. The effect of this is to give a degree of temperature feedback. One way to build a PTC heater is to sandwich the PTC material 108 between a hot conductor 104 and a neutral conductor 106. When a voltage is applied to the PTC material 108 via the conductors 104 and 106, the electrical current flow between conductors 104 and 106, through the PTC material 108, results in the generation of heat. As the PTC material 108 gets warm, its resistance rises, thereby reducing the current flow (for a given voltage input) and thereby reducing the watts of heat. One advantage to the "ring" configuration depicted in FIG. 8 is that the hot conductor 104 is everywhere electrically fed from two different points. So, if the hot conductor 104 is cut, there is negligible voltage difference between the two cut ends and so no electrical arcing results. A similar statement may be made about cuts in the neutral conductor 106.

Because its resistance varies with temperature, the PTC material itself can be used to measure temperature. In an electric blanket or heating pad, this is a desirable feature as it can be a means for temperature feedback. In FIG. 8, a current sensing resistor 101 has a voltage drop proportional to the amount of current flowing through the PTC load. The peak voltage drop is stored on capacitor 97 during the positive half cycle while the load is energized. At the zero crossing going to the negative half cycle, as the value of the neutral conductor 30 swings more positive than the hot conductor 34, the voltage stored on capacitor 97 determines the point at which diode 93 conducts to turn on the shunt regulator 82. So the length of the dead zone during the negative half cycles gives an indication of temperature (indirectly via a voltage that is proportional to a peak load current that is proportional to the temperature of the PTC material). The length of the dead zone during the positive half cycles gives information about the user setpoint via potentiometer 84. And, of course, ground faults can still be sensed at the plug as a shortened or non existent dead zone, and series arc faults may still be sensed as a lengthy dead zone.

Figure 9:
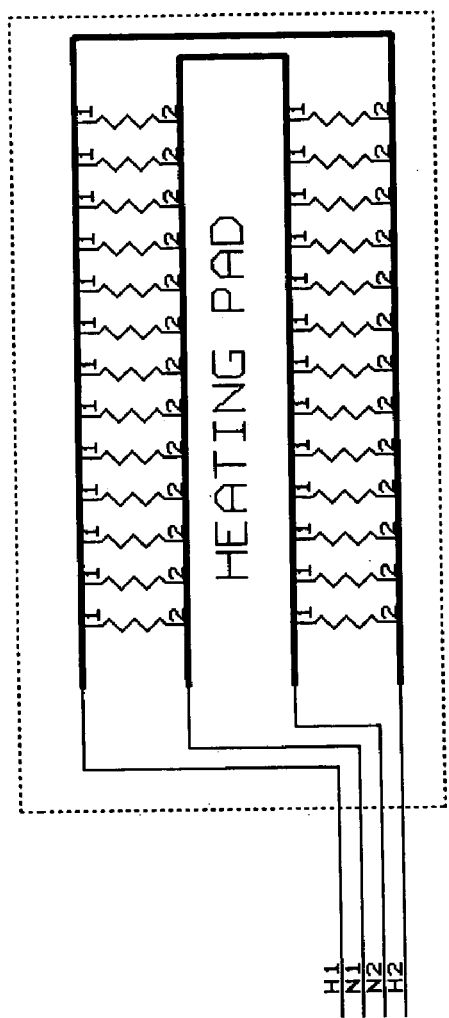
FIG. 9 depicts a PTC heating pad wherein four conductors connect to the load.

FIG. 9 depicts a PTC based heating pad having four inputs, H1, H2, N1 and N2. Conductors H1 and H2 are electrically connected together within the heating pad. Conductors N1 and N2 are electrically connected together within the heating pad. The PTC material is sandwiched between the H conductors and N conductors. If the inputs H1 and H2 are connected together and the inputs N1 and N2 are connected together, then the ring structure 102 depicted in FIG. 8 results. In FIG. 9, if the conductors between H1 and H2 are unbroken then points H1 and H2 maintain the same voltage potential. The same applies to N1 and N2. On the other hand, if a break occurs within the conductor that goes between H1 and H2 (equivalently N1 and N2) then a voltage potential difference can be developed across the break and this condition can be sensed as a fault condition and the power can be removed from the heating pad in response thereto.

Figure 10:
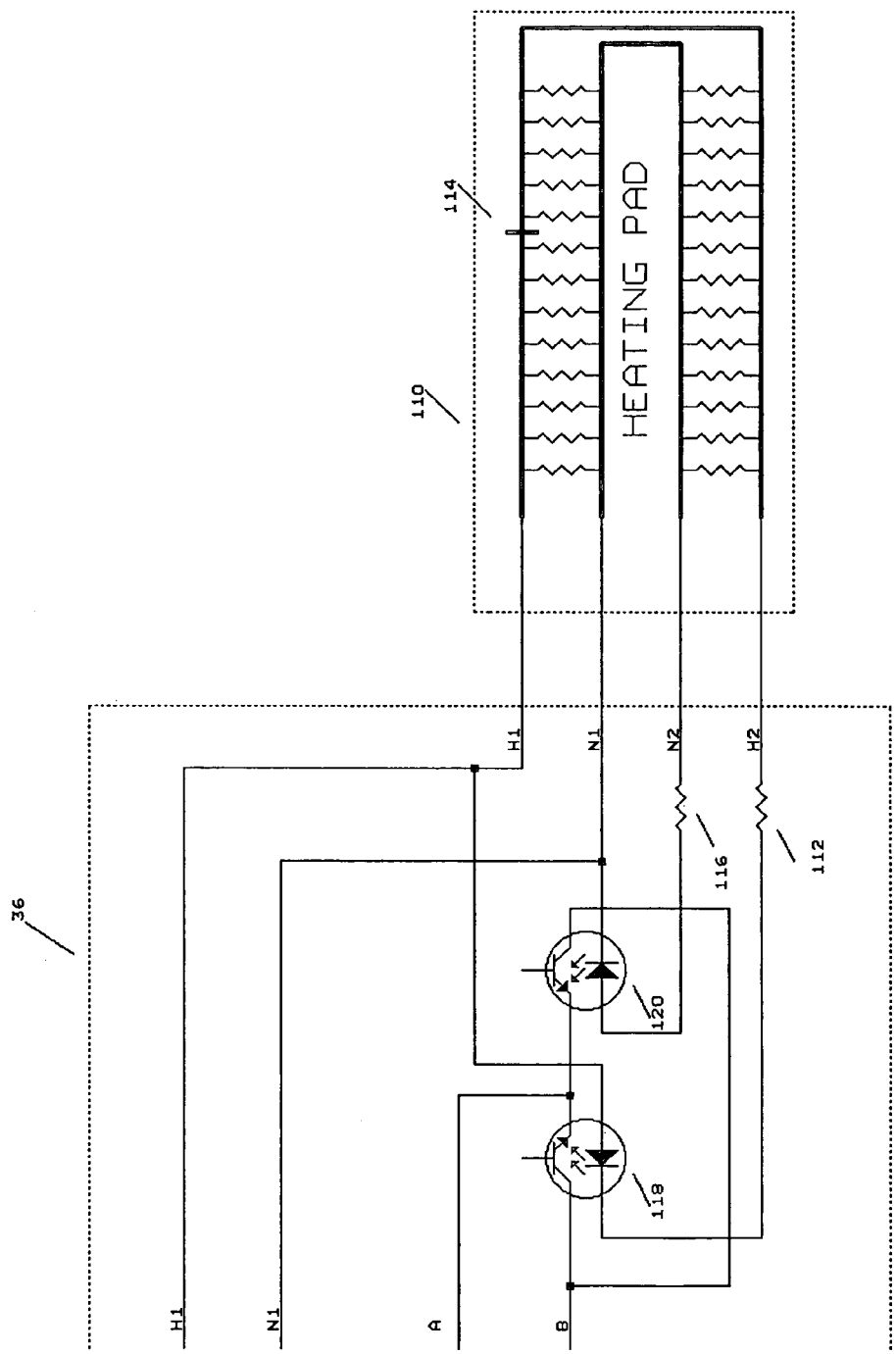
FIG. 10 depicts a PTC heating pad connected to a conductor breakage detector circuit.

FIG. 10 depicts one means for detecting a break in the conductors in a PTC based heater. A four wire PTC heating pad 110 is connected to energizing conductors H1 and N1 and is connecting to sense conductors H2 and N2. Dropping resistors 112, 116 serve to limit the current flow between H1 and H2 (equivalently N1 and N2) in the case of a break in the conductors. In the absence of a damaged conductor, H1 and H2 (equivalently N1 and N2) have the same voltage potential and no electrical current flows in resistors 112, 116. Suppose that a break 114 occurs in the conductor connecting H1 and H2. Then H2 is not directly connected to H1 but instead is indirectly connected to H1 through the PTC material (which is resistive) and is indirectly connected to N1–N2 through the PTC material. The result is that H2 will have a voltage that is different from H1 and current will flow through resistor 112 to energize optocoupler 118. This has the effect of turning on a transistor between points A and B during the positive half cycles. In an identical way, a break between conductors N1 and N2 will result in the energization of optocoupler 120 which also turns on a transistor between points A and B during the positive half cycles.

Figure 11:
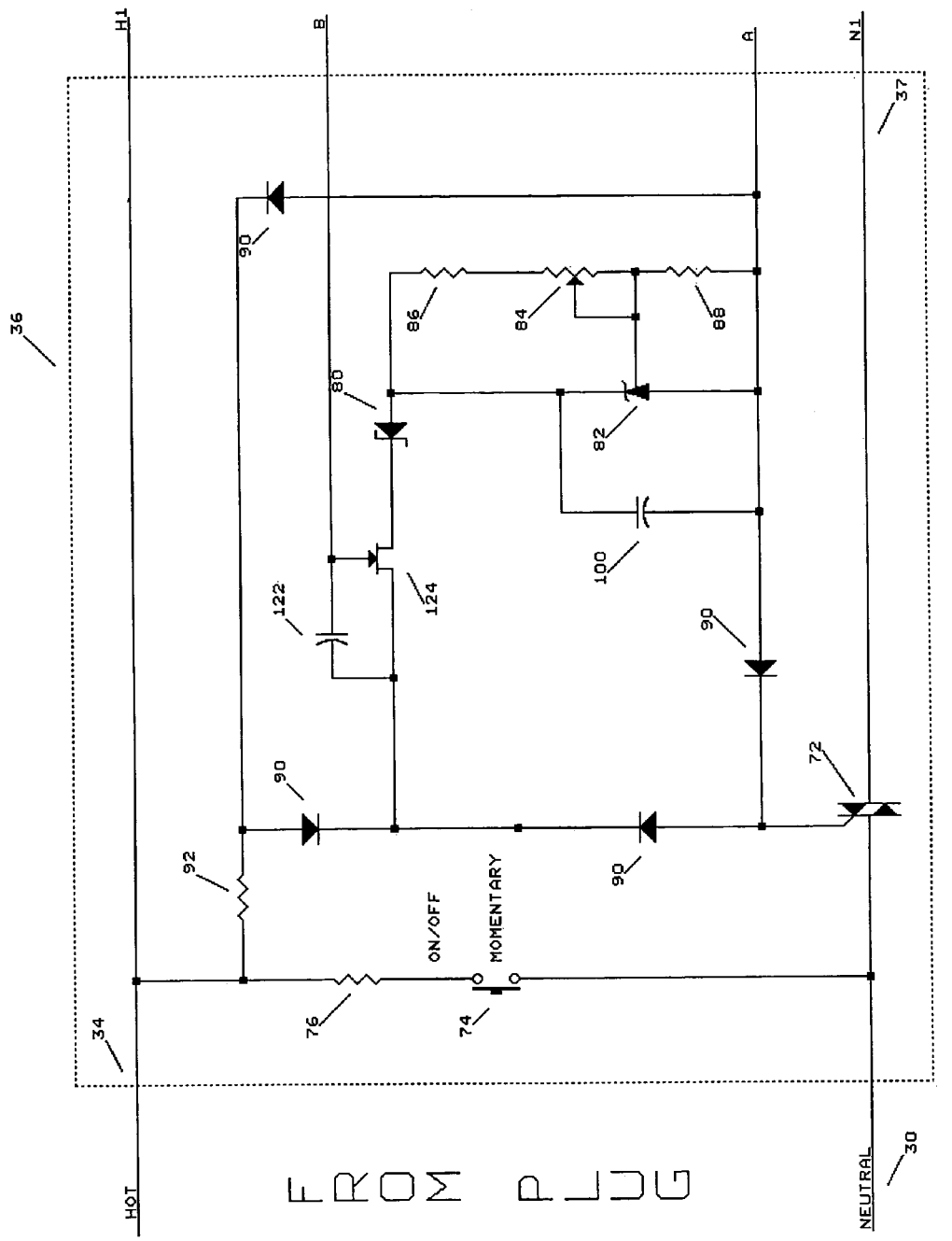
FIG. 11 depicts part of a user interface module for a four wire PTC heater.

FIG. 11 depicts the other half of the user interface module corresponding to the configuration of FIG. 10. This controller works similarly to the controller described in conjunction with FIG. 6. An N channel junction field effect transistor (JFET) style of transistor 124 has been added to enable or disable the firing of the thyristor 72. In normal operation, when points A and B have no direct electrical connection to each other, then JFET 124 maintains an ON condition and the circuit operates as described previously. A user controlled potentiometer 84 may be used to choose a temperature setpoint and this setpoint is communicated back to a controller in the plug via encoding upon the deadzone developed by thyristor 72.

When a transistor is turned on to connect points A and B, then during the positive half cycles, the JFET 124 is turned off. Since no current is allowed to flow to the gate of thyristor 72, the result is a very long deadzone which can be interpreted at the plug as an open conductor in the PTC heater. Since this only happens during positive half cycles, the controller in the plug can distinguish this condition as corresponding to a break in the conductors in the PTC heater as contrasted with a break in the conductors that deliver power to the heating pad (the latter which would result in long deadzones for both positive and negative half cycles).

In the discussions pertaining to the above embodiments for appliance control using deadzones, the deadzones have been produced by controlling thyristors to pass or to inhibit electrical current flow. One disadvantage to thyristors is that once turned on, they will continue to conduct until the occurrence of a zero crossing. This is because the current passing through the thyristor momentarily goes to zero at the zero crossing. It may sometimes be advantageous to turn off a thyristor at a time other than the zero crossing. By applying a current pulse or shunt around a thyristor, the thyristor will momentarily experience a zero current condition, and will shut off. In this way, a thyristor may be shut off before the zero crossing. This opens the door for additional communication channels whereby the conduction in either the thyristor in the plug or the load conditioning thyristor may be halted before the end of the half cycle.

Alternatively, power control means other than thyristors may be used. These include transistors, relays and circuit breakers. In particular, a type of electronic switch called a metal oxide field effect transistor, or MOSFET, exhibits very attractive properties. A MOSFET can be turned off and on at any time and is not limited to turn-off during zero current conditions.

Although the above discussion has assumed a plug communicating bidirectionally with a user module, the same theory may be applied to allow electronics at the plug to communicate with a "smart outlet". In this case, the smart outlet refers to an in-wall electrical outlet that has the ability to connect into a household information grid via either radio frequency communication, carrier currents imposed upon the AC power lines, twisted pair control or any of a number of other protocols that have been proposed to network various objects in a building. The advantage of the present invention is that it represents an extremely low cost (albeit low data rate) means to transmit information from one location to another using the power conductors that are already present. The electrical outlet can be a relatively high cost item. It can be configured to transmit information reliably throughout a building. Such transmission capability is complex and expensive. However, a building will have a limited number of outlets, these will be permanent fixtures, and their cost may be amortized over many years. In contrast, appliances are often regarded as consumables. They may have a limited life and they are extremely cost sensitive. With the proposed invention, by placing a low cost communication capability within the appliance or plug and a more sophisticated interfacing element within the outlet, the high level networking capability can reside in the outlet and may be used with any appropriately equipped appliance that is attached to the outlet. An appliance could (1) identify itself to a controller located within the outlet. This identification might include appliance type, rating, and serial number. An appliance could (2) give status information to the outlet, including on/off state, power setting, length of on time, or temperature. In turn, the outlet could receive this information and broadcast it to other objects connected to the building network.

The outlet might control the appliance by sending it a command to turn on/off, a desired temperature setpoint, or perhaps the outlet itself might turn off power to the outlet, thereby removing all appliance power. As discussed in conjunction with FIG. 4, the controller 26 within the plug 32 is capable of measuring the source zero-crossing times, and identifying power off/on toggling. It can use these to recognize commands from the outlet. For example, if a fan or electric iron was equipped with an electronic plug of the present invention, it could receive instructions from the outlet to turn off the fan or electric iron if there was no one at home. If the same appliance (in this case, a fan or electric iron) was plugged into a standard receptacle outlet that had no provision for tying into a home network, the appliance could still obtain control at the plug by turning on and off an in-plug thyristor in response to the switch positions at an interface module.

Figure 12:
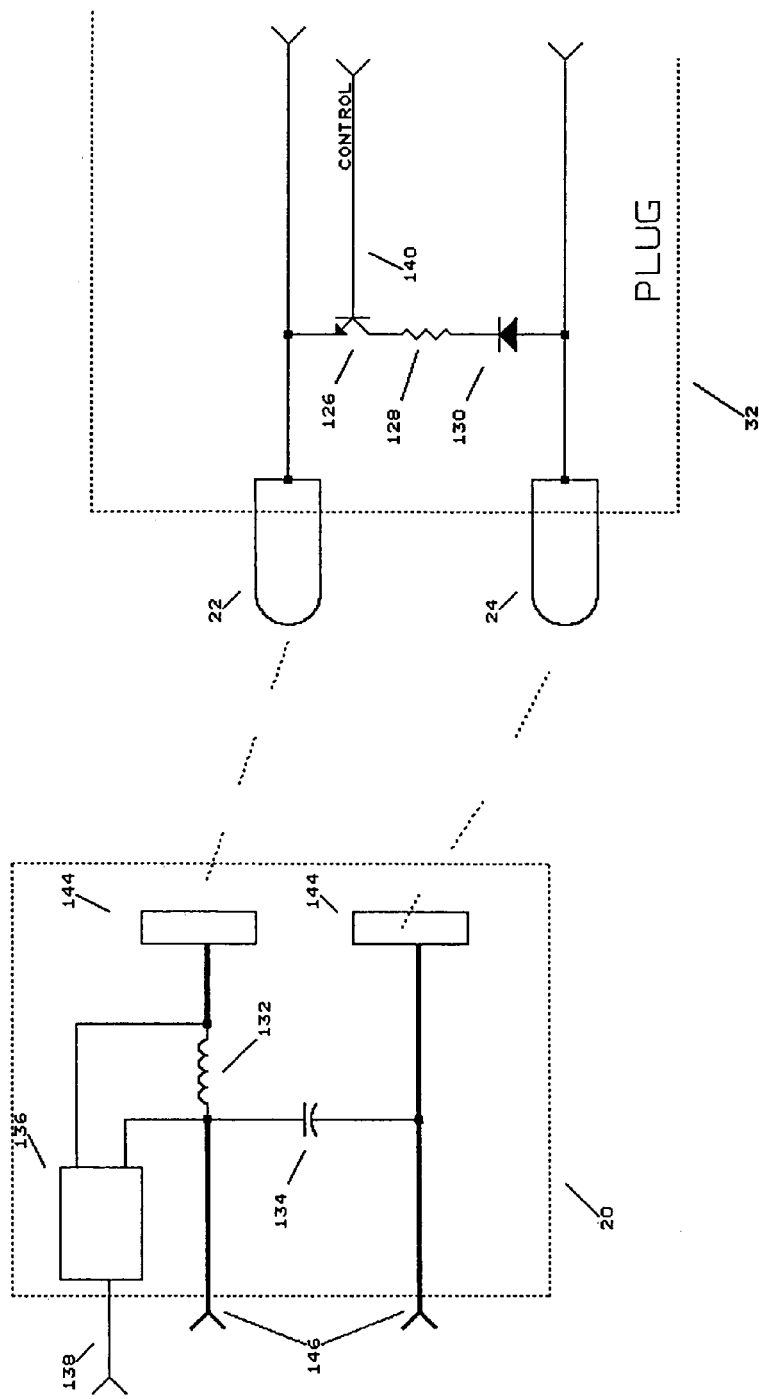
FIG. 12 depicts a communications interface between an appliance plug and a wall outlet.

FIG. 12 depicts the interaction between a plug located controller and a monitoring electronics module 136 within a wall outlet 20. Conductors 146 within outlet 20 serve to deliver AC power from a distribution network within the building. Plug prongs 22 and 24 are nominally inserted into the female receptacle holes denoted by 144. The plug 32 contains a controller (not shown) which, through control line 140, can turn off or on a transistor 126 to cause pulses of current to be drawn from the source. Limiting resistor 128 controls the current magnitude and blocking diode 130 serves to protect the transistor 126 from reverse currents. During the positive half cycles of the AC waveform, when the potential at plug prong 22 is greater than that at plug prong 24, by turning on transistor 126, a current pulse is drawn from the outlet 20 and through inductor 132. Suppose the limiting resistor 128 has a value of ten ohms and the transistor 126 is turned on for one microsecond at a time when the voltage at prong 22 is ten volts greater than the voltage at prong 24. By assuming ideal components, this will result in a pulse of current of 1 ampere passing through the limiting resistor 128. This causes an induced voltage in inductor 132 of $$V_L = L(di/dt) = L(1A/1 \ \mu sec) = L*10^6. \quad (1)$$

For inductor 132 having a value of 10 microhenry, this yields a voltage pulse across inductor 132 of 10 volts. That voltage can be read by the monitoring electronics 136 and processed, with multiple pulses serving to transmit binary information from the plug 32, to the outlet 20. Capacitor 134 serves to source the instantaneous power across the inductor 132. This communications protocol works only because the transmitter (that is, the transistor 126, resistor 128 and diode 130) and the receiver (that is, the inductor 132, capacitor 134 and monitoring electronics 136) are within about an inch of each other. The inductances and capacitances that exist throughout the distribution system prior to the outlet face and that exist downstream along the appliance cord and the appliance have minor influence.

Alternatively, rather than using the transistor 126 to impose power pulses, the plug electronics could simply control zero crossing deadzones into an appliance load.

These deadzone lengths and/or characteristics could be sensed at inductor 132 and interpreted by monitoring electronics 136.

The monitoring electronics 136 would nominally be connected into a household network via a network connection 138. This network connection 138 might be implemented through the existing wiring by placing a signal onto the power delivery wires within the house. Alternatively, the network connection might be implemented through dedicated control wiring. Alternatively, the network connection might be implemented through radio frequency or other wireless means. By tying the outlet into the household, the appliance now has a means of communicating into a home network.

Figure 13:
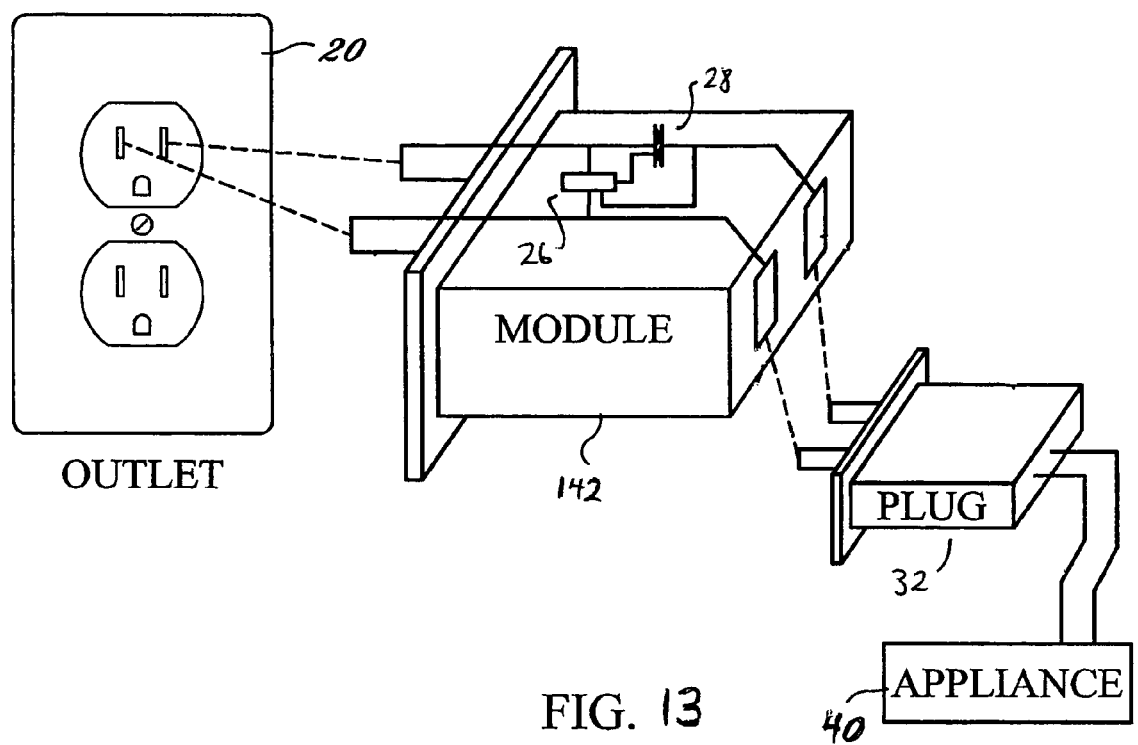
FIG. 13 depicts an embodiment wherein control electronics are resident in a plug-in module, rather than in a plug.

FIG. 13 depicts a module style of implementation of the technology. In this implementation, the controller 26 and thyristor 28 are resident in a plug module 142 into which a standard appliance is inserted. In FIG. 13, the plug 32 would not have any internal electronics but would be a conventional plug. The advantage to this implementation is that a plug module 142 may be used with different appliances at different times. For example, lamp dimming could be implemented by the plug module 142. Simply attach any lamp to the plug module 142. The controller 26 would be programmed to recognize switch closures at the lamp and would respond by transitioning through various levels of lamp dimming.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

The invention claimed is:

1. An apparatus for distributed control of an electrical appliance having a plug and a load and two power carrying conductors connecting said plug to said load, comprising:
   power control elements that are completely contained within said plug;
   interface elements that are connected to said two power carrying conductors and that are not contained within said plug; and
   means for transmitting status information from said interface elements to said power control elements by imposition of electrical signals onto said two power carrying conductors, wherein said electrical signals comprise an adjustable duration deadzone at a zero crossing of a sinusoidal excitation.

2. The apparatus of claim 1 wherein said status information includes items selected from the group consisting of switch state, temperature, light, sound, vibration, and presence of an electrical fault.

3. The apparatus of claim 1 wherein said power control elements are controlled in response to said status information.

4. The apparatus of claim 1 wherein said power control elements comprise one or more members selected from the group consisting of thyristors and transistors.

5. The apparatus of claim 1 wherein said interface elements are resident in a module that is located between said plug and said load.

6. The apparatus of claim 1 wherein said interface elements are located adjacent to said load.

7. The apparatus of claim 1 wherein said power control elements can interrupt power to said load.

8. The apparatus of claim 1 wherein said interface elements comprise one or more of the group consisting of switches, push buttons, potentiometers, and light emitting devices.

9. The apparatus of claim 1 wherein said load is selected from the group consisting of incandescent lights, electric blankets, heating pads, electric irons, fans, and aquarium heaters.

10. The apparatus of claim 1 wherein if said status information indicates presence of an electrical fault, power is interrupted by means of said power control elements.

11. An appliance control apparatus that is resident in a module insertable into a receptacle outlet and into which an appliance is plugged, said apparatus comprising means for controlling the appliance and means for transmitting status information to and/or from said appliance by imposition of electrical signals onto two power carrying conductors, wherein said electrical signals comprise an adjustable duration deadzone at a zero crossing of a sinusoidal excitation.

12. The apparatus of claim 11 wherein power control electronics are resident in said module.

13. The apparatus of claim 12 wherein said power control electronics are responsive to signals imposed upon the power carrying conductors.

14. A method for distributed control of an electrical appliance having a plug and a load and two power carrying conductors connecting the plug to the load, the method comprising the steps of:
   locating power control elements completely within the plug;
   connecting interface elements to the two power carrying conductors, which interface elements are not within the plug; and
   transmitting status information from the interface elements to the power control elements by imposition of electrical signals onto the two power carrying conductors, wherein the electrical signals comprise an adjustable duration deadzone at a zero crossing of a sinusoidal excitation.

15. The method of claim 14 wherein the status information includes items selected from the group consisting of switch state, temperature, light, sound, vibration, and presence of an electrical fault.

16. The method of claim 14 wherein the power control elements are controlled in response to the status information.

17. The method of claim 14 wherein the power control elements comprise one or more members selected from the group consisting of thyristors and transistors.

18. The method of claim 14 wherein the interface elements are resident in a module that is located between the plug and the load.

19. The method of claim 14 wherein the interface elements are located adjacent to the load.

20. The method of claim 14 wherein the power control elements can interrupt power to the load.

21. The method of claim 14 wherein the interface elements comprise one or more of the group consisting of switches, push buttons, potentiometers, and light emitting devices.

22. The method of claim 14 wherein the load is selected from the group consisting of incandescent lights, electric blankets, heating pads, electric irons, fans, and aquarium heaters.

23. The method of claim 14 wherein if the status information indicates presence of an electrical fault, power is interrupted by means of the power control elements.

24. An appliance control method employing a module insertable into a receptacle outlet and into which an appliance is plugged, the method comprising the steps of controlling the appliance and transmitting status information to and/or from the appliance by imposition of electrical signals onto two power carrying conductors, wherein the electrical signals comprise an adjustable duration deadzone at a zero crossing of a sinusoidal excitation.

25. The method of claim 24 wherein power control electronics are resident in the module.

26. The method of claim 25 wherein the power control electrinics are responsive to signals imposed upon the power carrying conductors.

* * * * *